Feb. 20, 1934.   J. DOLZA ET AL   1,948,340
GROOVE FOR MAIN BEARINGS
Filed April 17, 1931
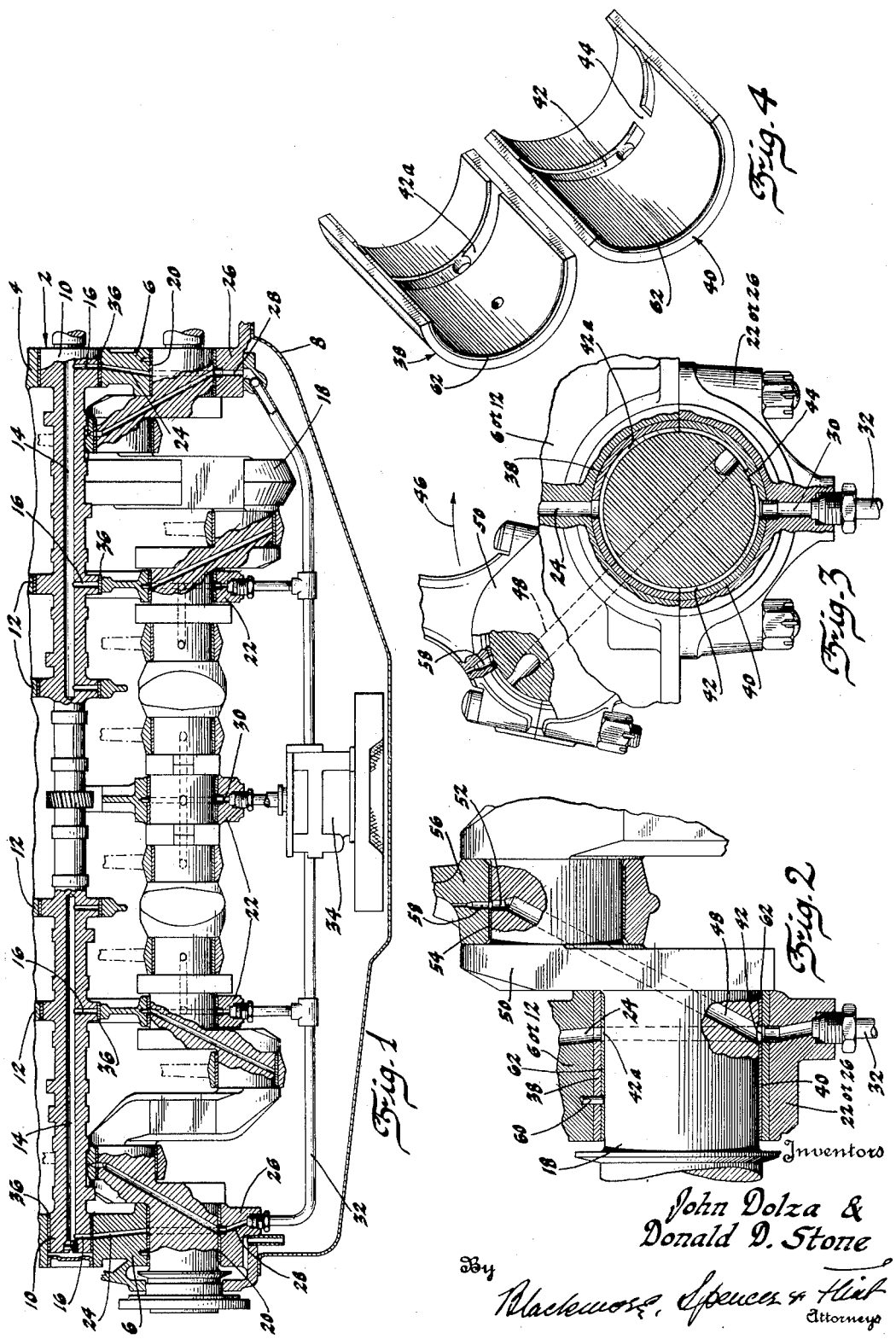
Inventors
John Dolza &
Donald D. Stone
By
Blackmore, Spencer & Hirt
Attorneys Patented Feb. 20, 1934

1,948,340

UNITED STATES PATENT OFFICE 1,948,340

GROOVE FOR MAIN BEARINGS

John Dolza and Donald D. Stone, Flint, Mich.; said Dolza assignor to General Motors Corporation, Detroit, Mich., a corporation of Delaware Application April 17, 1931. Serial No. 530,831

3 Claims. (Cl. 184—6)

This invention relates to lubricating systems and has particular reference to the lubrication of the main and crankthrow bearings of crankshafts.

In the lubrication of bearings of crankshafts, it is customary to provide the main bearing with an annular groove on the interior thereof, which groove is fed by a manifold receiving oil from an oil pump. The throw of the crankshaft has a passage drilled therethrough which communicates at one end with the annular groove to pass oil to the crankpin bearing, which in turn delivers oil to the connecting rod and to the wrist pin of the piston. While this system of lubrication has been satisfactory, it was found upon investigation that by forming the oil groove on the interior of the bearing only part way around that the pressure in the oil was built up, which forced a greater quantity into the crank throw passage to secure better lubrication of the crankpin and wrist pin.

In the present invention, the groove on the interior of the bearing does not extend entirely therearound but has a small portion, preferably adjacent the oil inlet opening, which is left ungrooved. The uncut portion of the groove is provided at the inlet opening farthest away therefrom when following the direction of rotation of the crankshaft.

On the drawing:

Figure 1 is a sectional view of a portion of an internal combustion engine showing the invention applied thereto.

Figure 2 is an enlarged sectional detail view of a portion of Figure 1 showing the invention on a larger scale.

Figure 3 is a detail view of the structure of Figure 2 taken at right angles thereto.

Figure 4 is a perspective view of the bearing halves showing the novel oil groove.

Referring to the drawing, the numeral 2 indicates an internal combustion engine as a whole. The engine has the usual cylinder block 4, crankcase 6, and oil pan 8. The camshaft 10 is mounted in suitable bearings in the end of the engine block and in ribs 12 extending from side to side of the block. The camshaft has the usual axial oil groove 14 and the lateral oil grooves 16 to lubricate the camshaft bearings. The crankshaft is indicated at 18 mounted in bearings 20 in the ends of the crankcase, and in bearings 22 in the intermediate ribs 12.

The crankcase is provided with the passages 24 and the bearings caps 26 have passages 28 to conduct oil to the end bearings 20. The bearing caps 22 are also provided with oil passages 30 and an oil manifold 32 is connected to all the bearing caps to deliver oil to the crankcase bearings. A pump 34 takes oil from the oil pan 8 and delivers it to the manifold 32.

At the end bearings 20, the oil from the manifold is delivered to the passages 28 into annular grooves in the bearings and then to the passages 24. From the passage 24, the oil passes through an opening in the bearing members 36 and to the end passages 16 of the camshaft from where the oil flows to the axial bore 14 and to the intermediary transverse passages 16.

The bearing halves for the main and crankpin bearings of the crankshaft 18 are shown at 38 and 40 in Figure 4. These bearings are conventional except that the oil groove or passage 42 in one of the bearing halves 40 does not extend entirely around the inner periphery of the bearing but has a portion 44 which is left ungrooved and which serves as a dam for the oil. The groove 42a in the bearing half 38 which mates with the groove 42 in the bearing 40, is formed entirely around the inner periphery of the bearing half and does not have the ungrooved portion 44.

The bearings in their operative position are best shown in Figures 2 and 3. Referring to Figure 3, it will be noted that the portion 44, or the dam in the groove 42, is positioned at the right of the inlet 30 in the bearing cap 22 or 26. The crankshaft rotates in the direction of the arrow 46 (Figure 3) so that the groove 42 will be farthest away from the inlet 30 when considering the direction of rotation of the crankshaft. The pump constantly will force oil under pressure into the inlet 30 which pressure will be built up in the groove 42, 42a and produce a greater tendency for the oil to be forced into the passage 48 in the throw 50 of the crankshaft. The passage 48 terminates at 52 to lubricate the bearing 54 in the connecting rod 56. The connecting rod has the opening 58 which may deliver the oil into a passage to conduct the oil to the wrist pin of the piston.

Suitable dowel pins 60 are shown to hold the bearing halves 38 and 40 in place. The bearing halves have the usual Babbitt liners shown at 62. By the use of the dam or ungrooved portion 44, the pressure from the pump will be built up in the groove 42, 42a so that at substantially any portion of the groove, the pressure will be the same and will therefore force the greater quantity of oil to the passage 48. The rotation of the crankshaft also will cause a rather high oil pressure to be built up at the end of the groove in the direction in which the crankshaft is rotating, or at the approach side of the dam 44 and, consequently, better will lubricate the bearing because it is connected with lubricant under higher pressure than would maintain if the groove in the bearing extended the full circumference thereof. With a groove of this type, it is possible to use low pressure in the lubricating system. This type of groove also boosts the oil pressure during cold starting on account of the friction between the crankshaft and oil. This phenomenon causes a rise of pressure from the oil hole to the end of the groove which increases with the speed of the engine and the viscosity of the oil.

We claim:

1. In a lubricating system for engines having a crankshaft, means for feeding oil to the main crankshaft bearings, an oil groove in the bearing surface of each bearing extending substantially therearound, a dam in the groove on the approach side of said means for feeding oil to build up oil pressure in said groove and an outlet in the crankshaft for conducting oil from the groove to the crankshaft throw.

2. In a lubricating system for engines having a crankshaft, means for feeding oil to the main crankshaft bearings, an oil groove in the bearing surface of each bearing extending substantially therearound and having an oil inlet, a dam in said groove on the approach side of said inlet to build up oil pressure in said groove, and an outlet from said groove in the crankshaft for taking oil from the groove for lubricating the crankshaft throw.

3. In a lubricating system for engines having a crankshaft, means for feeding oil to the main crankshaft bearings, an oil groove in the bearing surface of each bearing extending substantially therearound and having an oil inlet, a dam in said groove on the approach side of said inlet to build up oil pressure in said groove, and a conduit in the crankshaft registering with said groove for leading oil to the crankshaft throw.

JOHN DOLZA.
DONALD D. STONE.